(12) United States Patent
Yoshimoto et al.

(10) Patent No.: US 10,948,904 B1
(45) Date of Patent: Mar. 16, 2021

(54) PRODUCT INSPECTION SYSTEM AND PRODUCTION INSPECTION METHOD

(71) Applicant: Hitachi, Ltd., Tokyo (JP)

(72) Inventors: Hiroyuki Yoshimoto, Tokyo (JP);
Naoko Ushio, Tokyo (JP); Ryohei Matsui, Tokyo (JP); Hiroki Ohashi, Tokyo (JP); Toshinari Ishii, Tokyo (JP); Daiji Iwasa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/817,839

(22) Filed: Mar. 13, 2020

(30) Foreign Application Priority Data

Sep. 19, 2019 (JP) .............................. JP2019-170939

(51) Int. Cl.
| | |
|---|---|
| *G06Q 30/00* | (2012.01) |
| *G05B 19/418* | (2006.01) |
| *G06T 7/00* | (2017.01) |
| *H04N 7/18* | (2006.01) |

(52) U.S. Cl.
CPC ..... *G05B 19/41875* (2013.01); *G06Q 30/018* (2013.01); *G06T 7/0004* (2013.01); *H04N 7/185* (2013.01); *G05B 2219/32128* (2013.01); *G05B 2219/32368* (2013.01); *G06T 2207/10016* (2013.01); *G06T 2207/30248* (2013.01)

(58) Field of Classification Search
None
See application file for complete search history.

(56) References Cited

U.S. PATENT DOCUMENTS

| | | | | |
|---|---|---|---|---|
| 2002/0113870 | A1* | 8/2002 | Mueckl ................... | F16L 55/26 348/84 |
| 2009/0265193 | A1* | 10/2009 | Collins .............. | G06Q 30/0185 705/4 |
| 2015/0112647 | A1* | 4/2015 | Currin ................ | G06Q 10/0631 703/1 |
| 2018/0057021 | A1* | 3/2018 | Seavey ................. | E01D 19/106 |
| 2019/0303670 | A1* | 10/2019 | Bryden ................. | H04L 9/0643 |
| 2019/0391183 | A1* | 12/2019 | Cole ...................... | G01R 31/62 |

FOREIGN PATENT DOCUMENTS

JP        2004040343 A      2/2004

\* cited by examiner

*Primary Examiner* — Talha M Nawaz
(74) *Attorney, Agent, or Firm* — Mattingly & Malur, PC

(57) ABSTRACT

The product inspection system comprises an inspection information collecting unit which collects inspection information acquired from an inspection target, an inspection time acquisition unit which acquires an inspection time that the inspection information was acquired, a recording unit which mutually associates and records the inspection information collected by the inspection information collecting unit and the inspection time acquired by the inspection time acquisition unit, and a display control unit which displays the inspection information recorded in the recording unit on a display terminal.

6 Claims, 6 Drawing Sheets

US 10,948,904 B1

PRODUCT INSPECTION SYSTEM AND PRODUCTION INSPECTION METHOD

INCORPORATION BY REFERENCE

The disclosure of the following priority application is herein incorporated by reference: Japanese Patent Application No. 2019-170939 filed Sep. 19, 2019.

BACKGROUND OF THE INVENTION

1. Field of the Invention

The present invention relates to a product inspection system and a product inspection method.

2. Description of Related Art

In recent years, the working age population is decreasing in Japan pursuant to the advancement of decreasing birthrate and aging population, and the availability of workers is becoming a problem in the manufacturing industry, including automobile manufacturers. Moreover, on the other hand, the recall risk is increasing year-by-year particularly in automobile manufacturers pursuant to the advancement of globalization of the manufacturing industry, and demands for maintaining and improving the product quality are increasing.

Based on this kind of social background, in the manufacturing industry including automobile manufacturers, a scheme for ensuring the quality of products without depending on the skills and proficiency of workers is being demanded. Particularly in the inspection of completed vehicles in automobile factories, a scheme for ensuring accurate and highly reliable inspection results is being demanded.

In relation to the inspection of industrial products, for example, known is the technology described in PTL 1. PTL 1 discloses a system of preventing the falsification of video data by forwarding video data of the inspection target to a data management company by adding information such as the location and time that the video of the inspection target was recorded.

[PTL 1] Japanese Unexamined Patent Application Publication No. 2004-40343

SUMMARY OF THE INVENTION

While the technology described in PTL 1 can be applied to an inspection item such as the visual inspection that can be implemented using video data, such technology cannot be applied, for example, to an inspection item which requires information other than video data, such as the confirmation of whether the inspection target responds normally in response to a specific operation. Accordingly, with the technology of PTL 1, there is a problem in that the applicable scope thereof is limited to specific inspection items.

The product inspection system according to the present invention comprises an inspection information collecting unit which collects inspection information acquired from an inspection target, an inspection time acquisition unit which acquires an inspection time that the inspection information was acquired, a recording unit which mutually associates and records the inspection information collected by the inspection information collecting unit and the inspection time acquired by the inspection time acquisition unit, and a display control unit which displays the inspection information recorded in the recording unit on a display terminal.

The product inspection method according to the present invention comprises the steps of collecting inspection information acquired from the inspection target, acquiring an inspection time that the inspection information was acquired, recording the inspection information and the inspection time with mutually associated in a recording device, and displaying the inspection information recorded in the recording device on a display terminal.

According to the present invention, it is possible to ensure accurate and highly reliable inspection results for various inspection items.

DESCRIPTION OF EMBODIMENTS

First Embodiment

Figure 1:
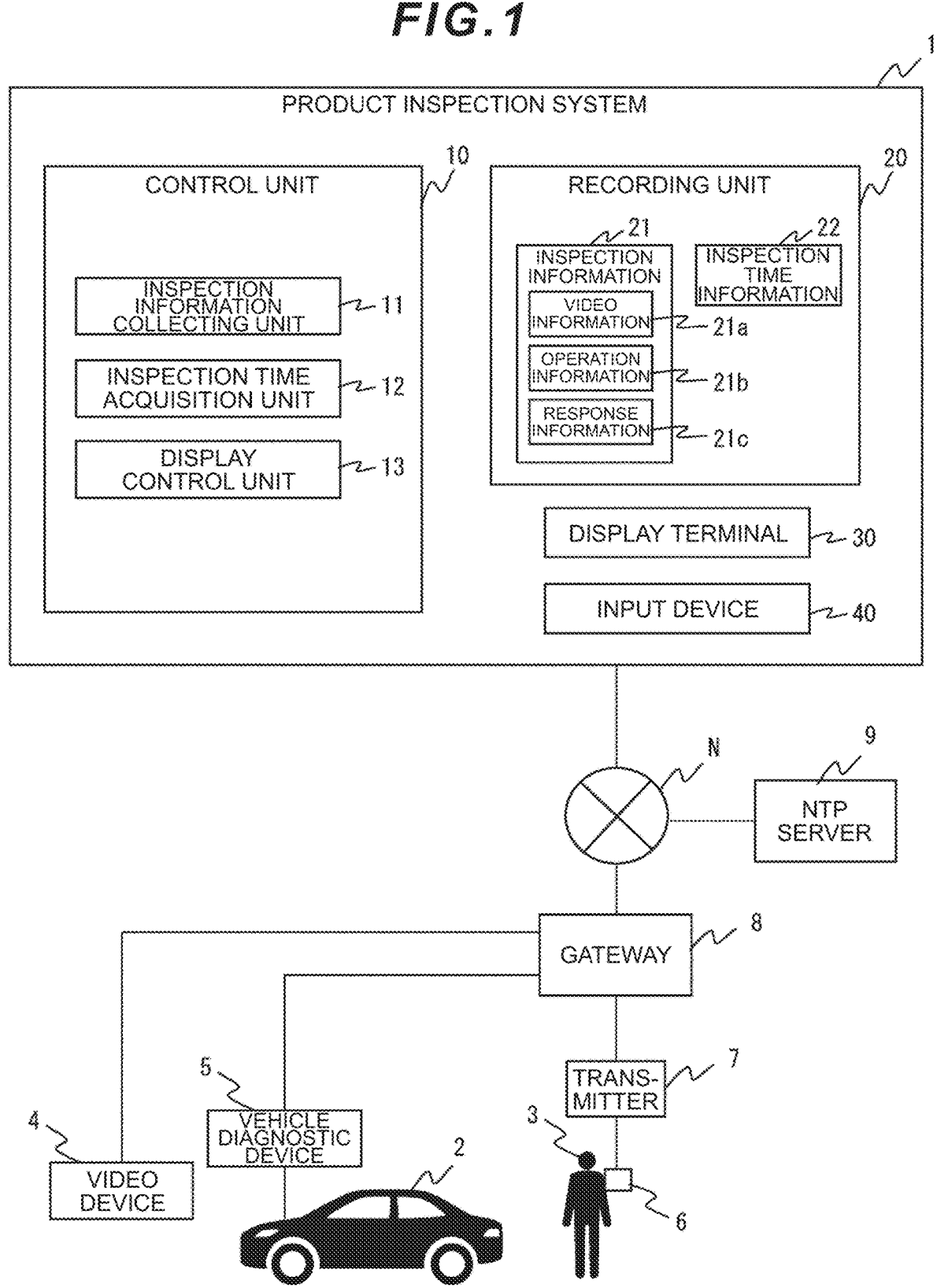
FIG. 1 is a diagram showing the configuration of the production inspection system according to the first embodiment of the present invention.

FIG. 1 is a diagram showing the configuration of a product inspection system 1 according to the first embodiment of the present invention. The product inspection system 1 shown in FIG. 1 is used for the inspection of a vehicle 2 as the inspection target, and comprises a control unit 10, a recording unit 20, a display terminal 30 and an input device 40. The product inspection system 1 is connected to a gateway 8 and an NTP (Network Time Protocol) server 9 via a network N configured from a LAN, the internet or the like.

The control unit 10 includes, as its functions, an inspection information collecting unit 11, an inspection time acquisition unit 12 and a display control unit 13. The control unit 10 is configured, for example, from a CPU, a ROM, a RAM and the like, and the respective functions of the inspection information collecting unit 11, the inspection time acquisition unit 12 and the display control unit 13 can be realized by executing predetermined programs. Note that it is also possible to prepare a GPU (Graphics Processing Unit) and an FPGA (Field-Programmable Gate Array) as the control unit 10 and use these to realize the respective functions of the inspection information collecting unit 11, the inspection time acquisition unit 12 and the display control unit 13.

The inspection information collecting unit 11 collects inspection information 21 that is sent from the gateway 8 via the network N, and records the inspection information 21 in the recording unit 20. The inspection information 21 is information related to the inspection result of the vehicle 2, and is configured by including video information 21a, operation information 21b and response information 21c.

Note that, in FIG. 1, while only one vehicle 2 is illustrated as the inspection target, in effect multiple vehicles 2 exist as the inspection target. Thus, the inspection information collecting unit 11 preferably uses a pre-set ID number (this is hereinafter referred to as the "inspection target ID") for identifying the individual vehicles 2 and records the inspection information 21 in the recording unit 20 based on the classification of each vehicle 2. Details of the video information 21a, the operation information 21b and the response information 21c will be explained later.

When the inspection information 21 is collected by the inspection information collecting unit 11, the inspection time acquisition unit 12 acquires information representing the time of such collection from the NTP server 9, and records the acquired information as the inspection time information 22 in the recording unit 20. The NTP server 9 is a server capable of providing accurate time information, and sends time information to the product inspection system 1 via the network N according to a request from the product inspection system 1. The inspection time acquisition unit 12 can reflect, in the inspection time information 22, the accurate time that the inspection information 21 was acquired by recording the time information provided from the NTP server 9 in the recording unit 20 as the inspection time information 22. Note that, in addition to the time information from the NTP server 9, for example, the time information measured with a clock built into the product inspection system 1 may also be used as the inspection time information 22.

The display control unit 13 performs display control to the display terminal 30. Note that a display screen example of the display terminal 30 will be explained later.

The recording unit 20 is a recording medium capable of reading and writing various types of data according to the control of the control unit 10, and is configured, for example, by using a HDD (Hard Disk Drive) or a SSD (Solid State Drive). The recording unit 20 has recorded therein the inspection information 21 as information related to the inspection result of the vehicle 2, and the inspection time information 22 representing the acquisition time of the inspection information 21. Note that other information, such as the programs to be executed by the control unit 10, may also be recorded in the recording unit 20.

The display terminal 30 is a device capable of displaying various types of images and videos according to the control of the control unit 10, and is configured, for example, by using a liquid crystal display or an organic EL display. An inspector using the product inspection system 1 can inspect the vehicle 2 at a site that is distant from the vehicle 2 by displaying the inspection information 21 recorded in the recording unit 20 on the display terminal 30.

The input device 40 is a device which accepts various types of input operations from the inspector using the product inspection system 1, and is configured, for example, by using a mouse, a keyboard, and a touch panel formed integrally with the display terminal 30. The inspector can input the inspection result of the vehicle 2, which was performed based on the inspection information 21, into the product inspection system 1 by performing input operations using the input device 40.

Note that a client terminal connected to the product inspection system 1 via the network N may be used in substitute for the display terminal 30 or the input device 40. In the foregoing case, the inspector can operate the product inspection system 1 and inspect the vehicle 2 from a remote location.

The gateway 8 is connected to a video device 4, a vehicle diagnostic device 5 and a transmitter 7 via wired or wireless connection.

The video device 4 acquires a video as a video recording of an inspection part of the vehicle 2 corresponding to a predetermined inspection item when the inspection worker 3 is performing inspection work to such inspection item of the vehicle 2. The video acquired by the video device 4 is sent as the video information 21a from the video device 4 to the gateway 8, and forwarded by the gateway 8 to the product inspection system 1 via the network N. The video information 21a is thereby recorded in the recording unit 20 as a part of the inspection information 21. Note that the video device 4 may be carried and operated by the inspection worker 3, or installed at a predetermined position near the vehicle 2. As a video device 4 to be carried by the inspection worker 3, for example, considered may be a wearable camera mounted on the head of the inspection worker 3, or a spectacle-type eye-tracking camera capable of detecting the line of sight of the inspection worker 3.

When the inspection worker 3 operates an operation part of the vehicle 2 corresponding to a predetermined inspection item in order to perform inspection work to such inspection item of the vehicle 2, the vehicle diagnostic device 5 acquires information that is output from the vehicle 2 in response to such operation. The information acquired by the vehicle diagnostic device 5 is sent as the response information 21c from the vehicle diagnostic device 5 to the gateway 8, and forward by the gateway 8 to the product inspection system 1 via the network N. The response information 21c is thereby recorded in the recording unit 20 as a part of the inspection information 21.

When the inspection work 3 operates the various types of operation parts of the vehicle 2 such as a switch, an accelerator pedal, a brake pedal, and a steering wheel of the vehicle 2, the vehicle diagnostic device 5 can acquire, as the response information 21c, information of the various types of sensors and the ECU (Electronic Control Unit) in the vehicle 2 corresponding to such operation which is output via an OBD2 connector equipped in the vehicle 2. Otherwise, the vehicle diagnostic device 5 can acquire the response information 21c by detecting the operating sound of the vehicle 2 (for example, sound of the turn signal), lighting state of the lights of the vehicle 2 (for example, headlight, brake lamp, turn signal, etc.), or movement of the moving parts of the vehicle 2 (for example, windshield wiper) according to the operation of the inspection worker 3. Otherwise, when the inspection worker 3 operates a predetermined operation part of the vehicle 2, so as long as it is information that is output in response to the operation of the operation part, the vehicle diagnostic device 5 may acquire any arbitrary information as the response information 21c.

The transmitter 7 is connected to the wearable sensor 6 worn by the inspection worker 3 via wired or wireless connection. When the inspection worker 3 operates an operation part of the vehicle 2 corresponding to a predetermined inspection item in order to perform inspection work to such inspection item of the vehicle 2, the wearable sensor 6 detects sensor information according to the operation and outputs the detected sensor information to the transmitter 7. The sensor information detected by the wearable sensor 6 and output to the transmitter 7 is sent as the operation information 21b from the transmitter 7 to the gateway 8, and forwarded by the gateway 8 to the product inspection system 1 via the network N. The operation information 21b is thereby recorded in the recording unit 20 as a part of the inspection information 21.

The wearable sensor 6 is, for example, a pressure sensor that is built into the gloves or shoes worn by the inspection worker 3, and, when the inspection worker 3 operates an operation part of the vehicle 2 such as the various types of switches, steering wheel, accelerator pedal, or brake pedal, detects the pressure that the hands or feet of the inspection worker 3 receive from such operation part. Moreover, the wearable sensor 6 may also be, for example, a microphone worn by the inspection worker 3, and may detect the sound when the inspection worker 3 operates the operation part. Moreover, the wearable sensor 6 may also be, for example, an inertial sensor or a myoelectric sensor built into the gloves, wristwatch, shoes, clothing, or supporter worn by the inspection worker 3, and may detect the movement of the body when the inspection worker 3 operates the operation part; that is, the movement of the hands and feet, joints, or muscles of the inspection worker 3. Note that the wearable sensor 6 may also be configured by combining a plurality of types of sensors. The transmitter 7 can acquire the foregoing sensor information detected by the wearable sensor 6 as the operation information 21b. Otherwise, when the inspection worker 3 operates a predetermined operation part of the vehicle 2, so as long as it is sensor information that is related to the physical state sensed by the inspection worker 3 according to the operation, the wearable sensor 6 may acquire any arbitrary sensor information as the operation information 21b.

Figure 2:
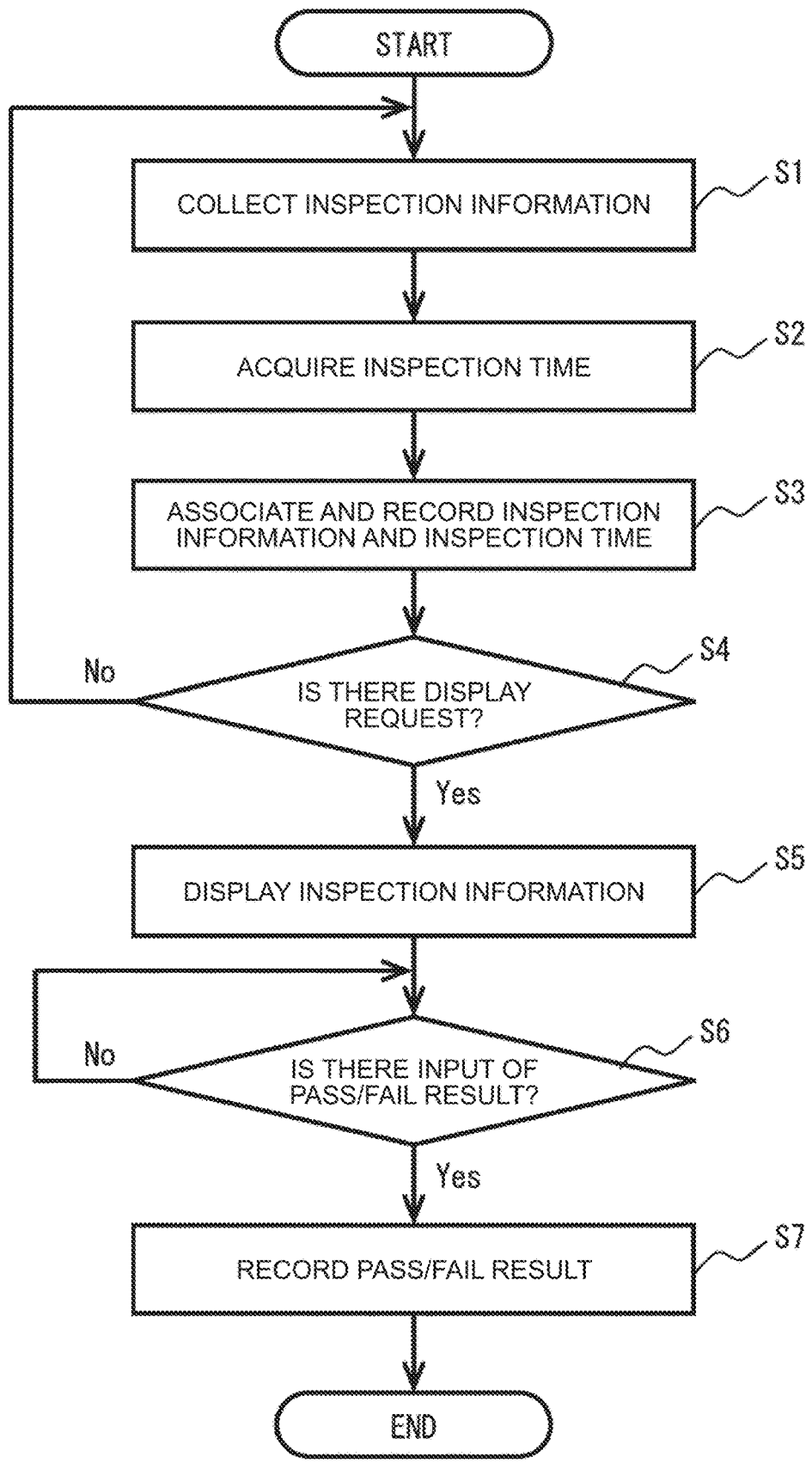
FIG. 2 is a flowchart showing the flow of processing of the production inspection system according to the first embodiment of the present invention.

The processing of the product inspection system 1 is now explained. FIG. 2 is a flowchart showing the flow of processing of the product inspection system 1 according to the first embodiment of the present invention. The product inspection system 1 of this embodiment performs processing according to the flowchart of FIG. 2 and conducts the inspection of the vehicle 2 by the control unit 10 executing predetermined programs.

In step S1, the control unit 10 uses the inspection information collecting unit 11 to collect the inspection information 21. Here, as described above, the video information 21a, the operation information 21b and the response information 21c sent from the gateway 8 via the network N are collected as the inspection information 21 of the vehicle 2.

In step S2, the control unit 10 uses the inspection time acquisition unit 12 to acquire the inspection time that the inspection information 21 collected in step S1 was acquired. Here, as described above, the inspection time is acquired by acquiring the time that the inspection information 21 was collected in step S1 from the NTP server 9 via the network N.

In step S3, the control unit 10 mutually associates the inspection information 21 collected in step S1 and the inspection time acquired in step S2 and records the mutually associated inspection information 21 and inspection time in the recording unit 20. The inspection information 21 and the inspection time information 22 are thereby mutually associated and recorded in the recording unit 20.

In step S4, the control unit 10 determines whether a display request was made by the inspector. When the inspector performed a predetermined input operation using the input device 40 and made a display request of the inspection information 21 to the product inspection system 1, the control unit 10 determines that a display request was made, and proceeds to step S5. Meanwhile, when a predetermined input operation was not performed, the control unit 10 determines that a display request was not made, and returns to step S1 and continues the collection of inspection information.

In step S5, the control unit 10 uses the display control unit 13 to read the inspection information 21 from the recording unit 20 and display the inspection information 21 on the display terminal 30.

Figure 3:
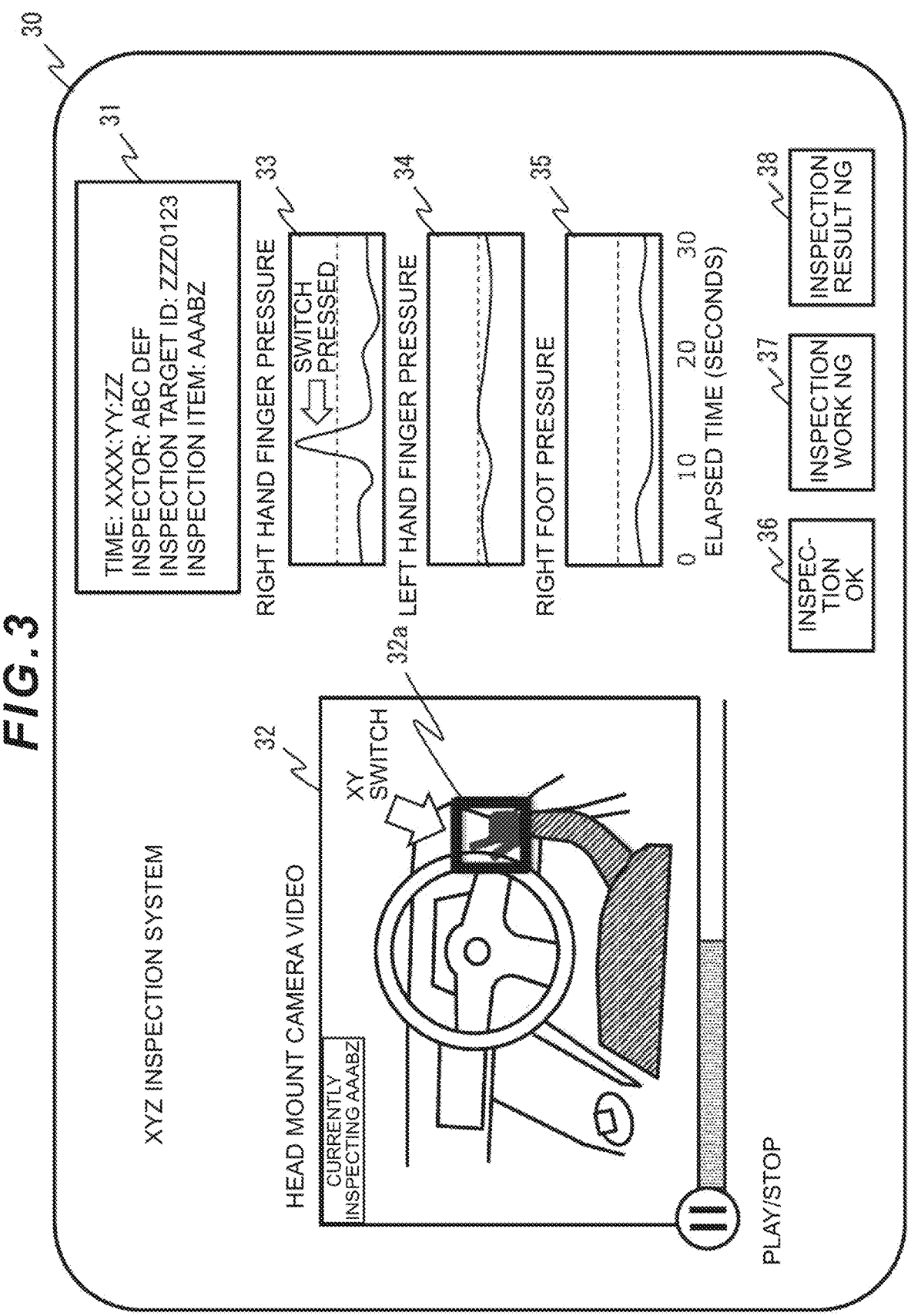
FIG. 3 is a diagram showing a screen example when inspection information is displayed on the display terminal.

FIG. 3 is a diagram showing a screen example when the inspection information 21 is displayed on the display terminal 30. In the screen example shown in FIG. 3, displayed within a display frame 31 are information such as the time that the inspection worker 3 acquired the inspection information 21 and the name for identifying the inspection worker 3, as well as information such as the inspection target ID for identifying the individual vehicle 2 as the inspection target, and the inspection item name Displayed within a display frame 32 is, of the inspection information 21, a video as a playback of the video information 21a recorded by the video device 4 mounted on the head of the inspection worker 3. In the example of FIG. 3, in order to indicate the place that should be closely observed by the inspector, an observation frame 32a indicating the operation part of the vehicle 2 corresponding to the inspection item represented by the inspection information 21 is displayed by being superimposed on the video displayed in the display frame 32.

Display frames 33 to 35 respectively show, of the inspection information 21, the state of the time change of the operation information 21b acquired by the wearable sensor 6 worn by the inspection worker 3. Note that the display frame 33 shows the pressure received by the fingers of the right hand of the inspection worker 3, the display frame 34 shows the pressure received by the fingers of the left hand of the inspection worker 3, and the display frame 35 shows the pressure received by the right foot of the inspection worker 3, respectively. The screen example of FIG. 3 shows a state where the inspection worker 3 is pressing a predetermined operation switch of the vehicle 2 with a finger of one's right hand.

A display frame 36 shows whether the response from the vehicle 2 was normal upon acquiring the inspection information 21. The content of the display frame 36 may be decided based on the response information 21c of the inspection information 21. Otherwise, the content of the display frame 36 may be decided by the inspector confirming the response information 21c. A display frame 37 shows whether the inspection work performed by the inspection worker 3 was normal, and a display frame 38 shows the inspection result in response to the inspection information 21. The inspector determines whether the inspection work was performed properly by confirming the contents of the display frames 31 to 36 on the screen of the display terminal 30, and inputs the determination result into the product inspection system 1 by operating the input device 40. The content of the display frame 37 is thereby decided, and the content of the display frame 38 which indicates the final inspection result is also decided based on the contents of the display frames 36 and 37. Otherwise, the inspector may decide the content of the display frame 38 by determining the inspection result.

Note that the screen example of FIG. 3 explained above is merely an example of the screen displaying the inspection information 21, and the screen configuration is not limited thereto. Any arbitrary screen configuration may be adopted so as long as the inspection information 21 can be appropriately displayed on the display terminal 30.

Returning to the explanation of FIG. 2, in step S6, the control unit 10 determines whether there was an input of the pass/fail determination result in response to the inspection information 21 displayed in step S5. For example, in the screen example of FIG. 3, when the contents of the display frames 36 to 38 are respectively decided according to the inspector's input operation, the processing proceeds to subsequent step S7.

In step S7, the control unit 10 combines the pass/fail determination result input in step S6 with the inspection information 21, and records the combination in the recording unit 20. The inspection result in response to the inspection information 21 is thereby recorded in the recording unit 20. Once the processing of step S7 is ended, the control unit 10 ends the processing shown in the flowchart of FIG. 2.

According to the first embodiment of the present invention explained above, the following effects are yielded.

(1) A product inspection system 1 comprises an inspection information collecting unit 11 which collects inspection information 21 acquired from a vehicle 2 as an inspection target, an inspection time acquisition unit 12 which acquires an inspection time that the inspection information 21 was acquired, a recording unit 20 which mutually associates and records the inspection information 21 collected by the inspection information collecting unit 11 and the inspection time acquired by the inspection time acquisition unit 12, and a display control unit 13 which displays the inspection information 21 recorded in the recording unit 20 on a display terminal 30. As a result of adopting the foregoing configuration, it is possible to record the inspection time of the inspection information 21 acquired by an inspection worker 3 by excluding the involvement of the inspection worker 3. Accordingly, accurate and highly reliable inspection results can be ensured for various inspection items.

(2) The inspection information collecting unit 11 collects, as the inspection information 21, video information 21a acquired by a video device 4 recording a video of a predetermined inspection part of the vehicle 2 as the inspection target. As a result of adopting the foregoing configuration, the video information 21a representing the video of the state during the inspection work performed by the inspection worker 3 can be collected as the inspection information 21. Thus, the inspector can accurately determine the inspection result based on the inspection information 21.

(3) The inspection information collecting unit 11 collects, as the inspection information 21, operation information 21b when an inspection worker 3 operates a predetermined operation part of the vehicle 2 as the inspection target, and response information 21c of the vehicle 2 in response to the operation of the operation part. Here, the inspection information collecting unit 11 collects, as the operation information 21b, sensor information detected by a wearable sensor 6 worn by the inspection worker 3 upon the inspection worker 3 operating a predetermined operation part of the vehicle 2. As a result of adopting the foregoing configuration, the operation information 21b representing the physical state sensed in response to the operation during the inspection work performed by the inspection worker 3, and the response information 21c representing the response of the vehicle 2 in response to that operation, can be collected as the inspection information 21. Thus, the inspector can accurately determine the inspection result based on the inspection information 21.

Second Embodiment

The second embodiment of the present invention is now explained. This embodiment explains a case where the inspection work is performed automatically.

Figure 4:
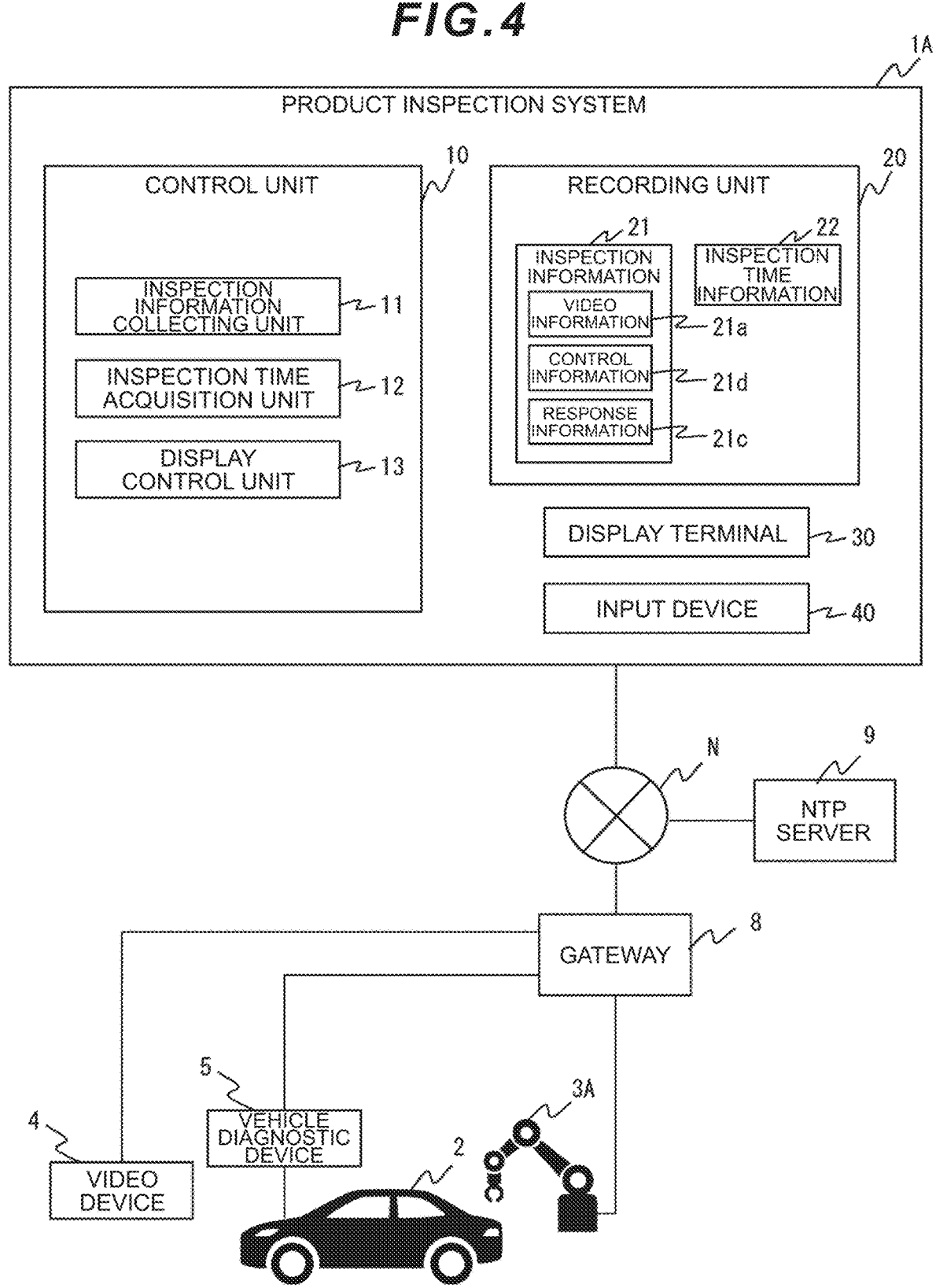
FIG. 4 is a diagram showing the configuration of the product inspection system according to the second embodiment of the present invention.

FIG. 4 is a diagram showing the configuration of a product inspection system 1A according to the second embodiment of the present invention. The product inspection system 1A shown in FIG. 4 differs from the product inspection system 1 explained in the first embodiment with respect to the point that the operation information 21b of FIG. 1 is replaced with control information 21d. In the following explanation, the product inspection system 1A of this embodiment is explained mainly regarding the differences in comparison to the first embodiment.

In this embodiment, the inspection work of the vehicle 2 is automatically performed by an automatic inspection operation device 3A. The automatic inspection operation device 3A is an industrial robot capable of automatically operating the vehicle 2 as the inspection target, and performs inspection work corresponding to the respective inspection items of the vehicle 2 that are set in advance by being operated according to a predetermined program. When the automatic inspection operation device 3A operates a predetermined operation part of the vehicle while performing inspection work, various types of control information used in the motion control of the automatic inspection operation device 3A for such operation; for example, information of the current, voltage, torque, displacement, and hydraulic pressure, are sent from the automatic inspection operation device 3A to the gateway 8.

The gateway 8 is connected to the automatic inspection operation device 3A via wired or wireless connection, and forwards the information sent from the automatic inspection operation device 3A to the product inspection system 1A as the control information 21d. The control information 21d is thereby recorded in the recording unit 20 as a part of the inspection information 21. Note that, so as long as it is information representing the operating state of the automatic inspection operation device 3A during inspection work, any arbitrary information may be recorded in the recording unit 20 as the control information 21d.

With the product inspection system 1A of this embodiment, in step S1 of FIG. 2, the control unit 10 uses the inspection information collecting unit 11 to collect, as the inspection information 21 of the vehicle, the video information 21a, the control information 21d and the response information 21c sent from the gateway 8 via the network N. Subsequently, upon displaying the inspection information 21 on the display terminal 30 in step S5, the control unit 10 displays information based on the control information 21d in substitute for the display frames 33 to 35 of FIG. 3. The inspector can thereby determine whether the inspection work was performed properly.

According to the second embodiment of the present invention explained above, the inspection information collecting unit 11 collects, as the inspection information 21, control information 21d of an automatic inspection operation device 3A, which is able to automatically operate the vehicle 2 as the inspection target, when the automatic inspection operation device 3A operates a predetermined operation part of the vehicle 2, and response information 21c of the vehicle 2 in response to the operation of the operation part. As a result of adopting the foregoing configuration, the control information 21d representing the operating state of the automatic inspection operation device 3A in response to the operation during the inspection work performed by the automatic inspection operation device 3A, and the response information 21c representing the response of the vehicle 2 in response to that operation, can be collected as the inspection information 21. Thus, the inspector can accurately determine the inspection result based on the inspection information 21.

Third Embodiment

The third embodiment of the present invention is now explained. This embodiment explains a case where the inspection result is determined automatically.

Figure 5:
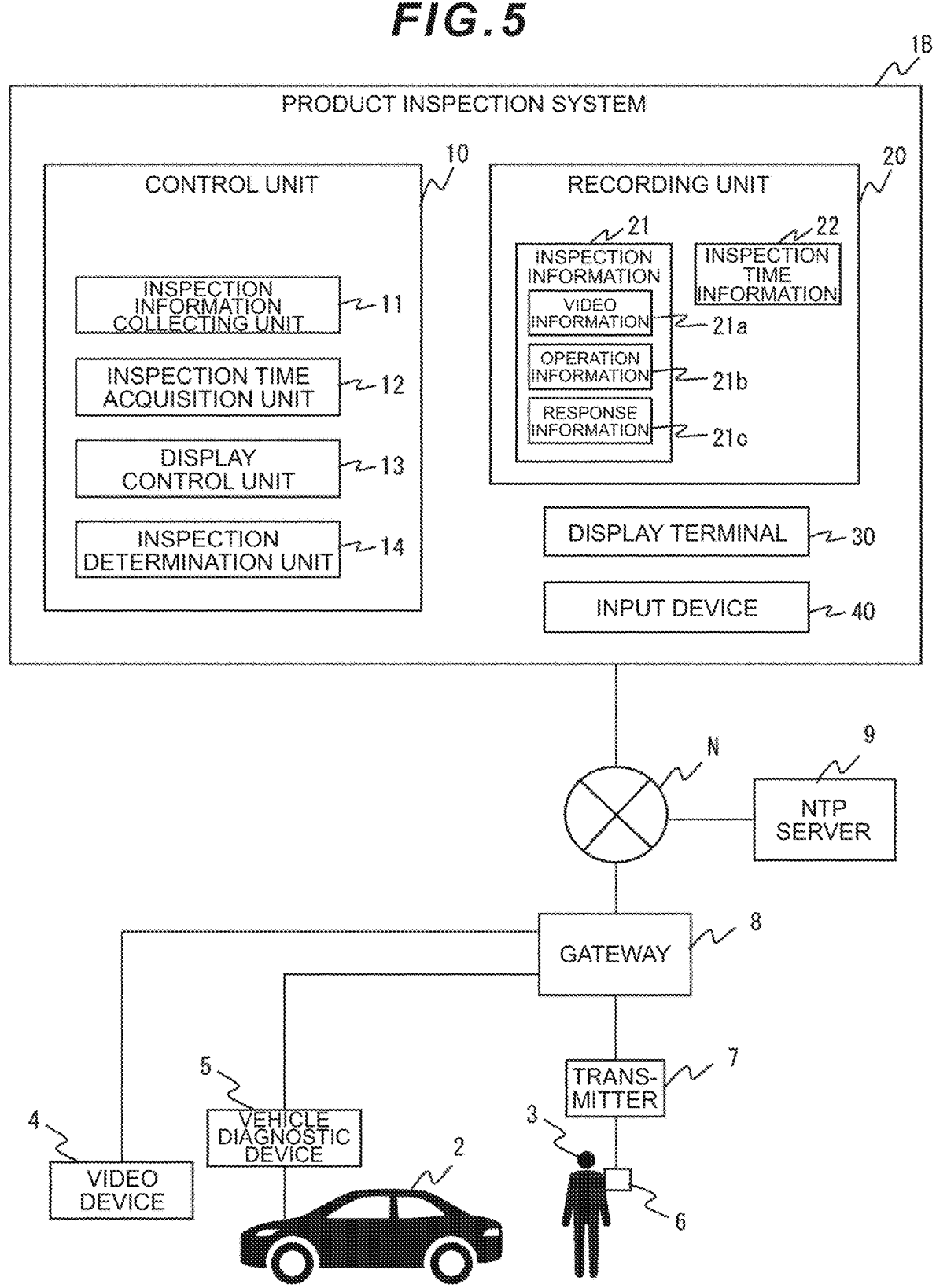
FIG. 5 is a diagram showing the configuration of the production inspection system according to the third embodiment of the present invention.

FIG. 5 is a diagram showing the configuration of a product inspection system 1B according to the third embodiment of the present invention. The product inspection system 1B shown in FIG. 5 differs from the product inspection system 1 explained in the first embodiment with respect to the point of the control unit 10 additionally comprising an inspection determination unit 14. In the following explanation, the product inspection system 1B of this embodiment is explained mainly regarding the differences in comparison to the first embodiment.

The inspection determination unit 14 determines the inspection result of the vehicle 2 as the inspection target based on the inspection information 21 recorded in the recording unit 20. The inspection determination unit 14 can be realized, for example, based on AI (Artificial Intelligence) using deep learning.

Figure 6:
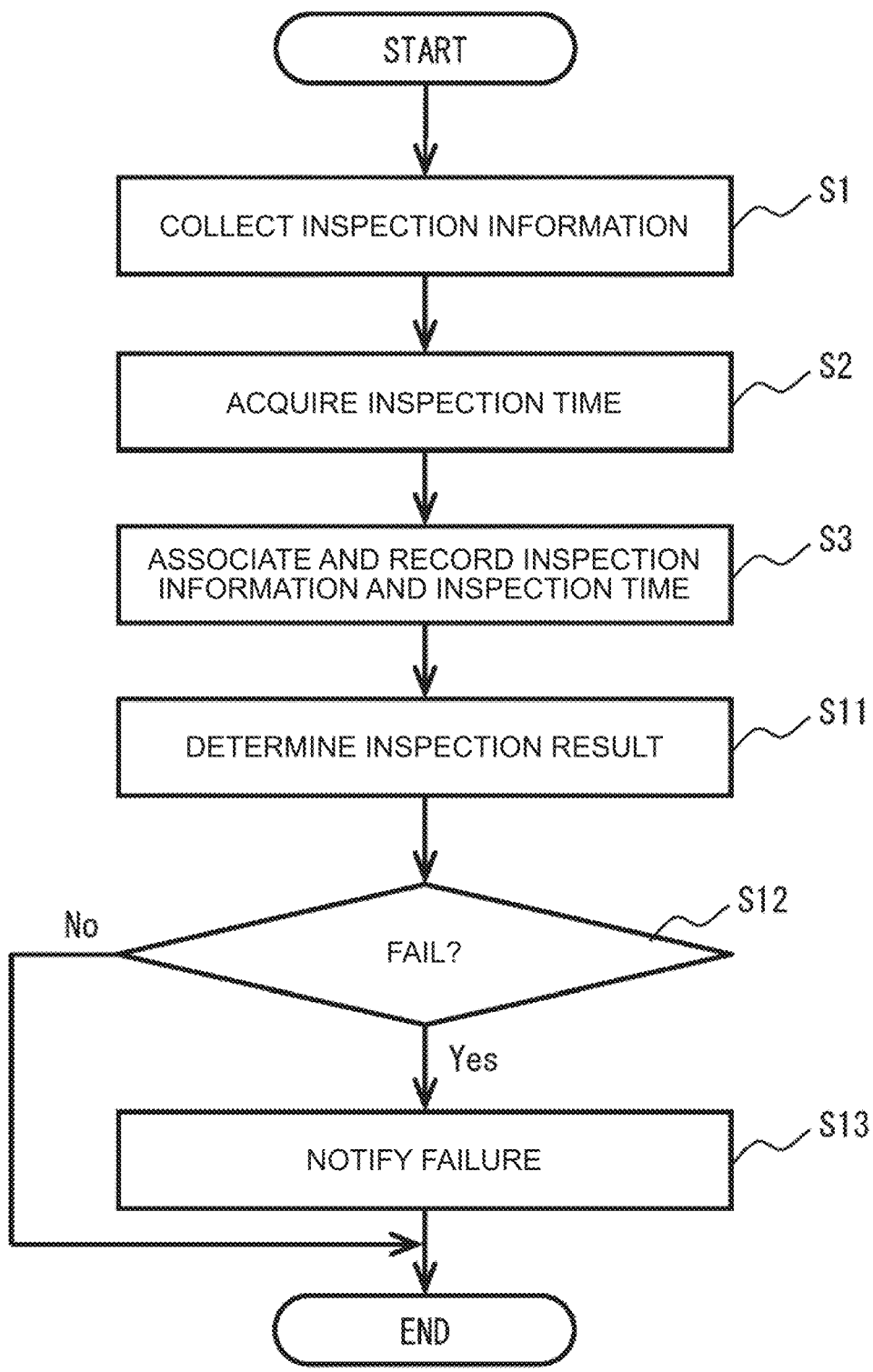
FIG. 6 is a flowchart showing the flow of processing of the production inspection system according to the third embodiment of the present invention.

FIG. 6 is a flowchart showing the flow of processing of the product inspection system 1B according to the third embodiment of the present invention. The product inspection system 1B of this embodiment performs processing according to the flowchart of FIG. 6 and conducts the inspection of the vehicle 2 by the control unit 10 executing predetermined programs.

In steps S1 to S3, the control unit 10 performs the same processing as the flowchart of FIG. 2 explained in the first embodiment.

After performing step S3, the control unit 10, in step S11, uses the inspection determination unit 14 to determine the inspection result of the inspection item corresponding to the inspection information 21 based on the inspection information 21 recorded in the recording unit 20.

In step S12, the control unit 10 determines whether the inspection result determined in step S11 was "fail". When the inspection result is "fail", the control unit 10 proceeds to step S13, notifies the inspector monitoring the product inspection system 1B to such effect in step S13, and thereafter ends the processing shown in the flowchart of FIG. 6. Meanwhile, when the inspection result was "pass", the control unit 10 does not execute the processing of step S13, and ends the processing shown in the flowchart of FIG. 6.

According to the third embodiment of the present invention explained above, the product inspection system 1B further comprises an inspection determination unit 14 which determines an inspection result of the vehicle 2 as the inspection target based on the inspection information 21 recorded in the recording unit 20. As a result of adopting the foregoing configuration, even fairer and highly reliable inspection results can be obtained because the intervention of a human in the determination of the inspection result can be excluded.

Each of the first to third embodiments explained above may be arbitrarily combined. For example, by combining the second embodiment and the third embodiment, it is possible to realize a product inspection system in which the determination of the inspection result can be automated in addition to the automation of the inspection work. Moreover, by combining the first embodiment and the third embodiment, an even more accurate inspection result can be obtained as a result of both the inspector and AI determining the inspection result. Otherwise, each of the foregoing embodiments may be arbitrarily combined.

In each of the embodiments explained above, the product inspection system 1, 1A, 1B may be installed within the same facility as the inspection site where the inspection work of the vehicle 2 is to be performed, or installed at a different site. Moreover, by placing the product inspection system 1, 1A, 1B under the control of a third-party inspection agency that is different from the automobile manufacturer to perform the inspection work of the vehicle 2, accurate and highly reliable inspection results can be ensured with certainty. Furthermore, by enabling a plurality of inspectors to log onto the product inspection system 1, 1A, 1B and causing such plurality of inspectors to perform the inspection, a fair inspection result can be ensured.

In each of the embodiments described above, when it is determined that the inspection result was "fail", such inspection result may be notified in real-time to the place where the inspection work of the vehicle 2 is being performed. In the foregoing case, the inspection worker 3 or the operator of the automatic inspection operation device 3A can immediately discontinue the inspection process and redo the inspection. Otherwise, an inspection item in which the inspection result was "fail" may be notified after the completion of the series of inspection processes. In the foregoing case, it is possible to prevent the discontinuation of the overall inspection process even when the inspection result was "fail" for one vehicle 2 while the inspection of multiple vehicles 2 is being performed in a flow operation. Thus, the overall inspection process can be sped up.

The log of the inspection information 21 of each vehicle 2 obtained in each embodiment explained above may be sent, together with the inspection result, from the product inspection system 1, 1A, 1B to a third-party agency that is different from the automobile manufacture that is manufacturing the vehicle 2. As a result of adopting the foregoing configuration, the inspection information 21 can be utilized as evidence of the inspection result. Moreover, the log of the inspection information 21 of each vehicle 2 may be retained within the automobile manufacturer, and utilized in the training of the inspection worker 3. Otherwise, the inspection information 21 obtained in the product inspection system 1, 1A, 1B may also be utilized for various uses.

The respective embodiments and various types of modified examples explained above are merely illustrative, and the present invention is not limited thereto so as long as the subject matter thereof does not impair the features of this invention. Moreover, while various types of embodiments and modified examples were explained above, the present invention is not limited thereto. Other modes that are considered to fall within the technical scope of the present invention are also covered by this invention.

What is claimed is:

1. A product inspection system, comprising:
   an inspection information collecting unit which collects inspection information acquired from an inspection target, the inspection target being a vehicle identified by an inspection target ID;
   an inspection time acquisition unit which acquires an inspection time that the inspection information was acquired;
   a recording unit which mutually associates and records the inspection information collected by the inspection information collecting unit and the inspection time acquired by the inspection time acquisition unit; and
   a display control unit which displays the inspection information recorded in the recording unit on a display terminal,
   wherein the inspection information collecting unit collects, as the inspection information, video information acquired by a video device recording a video of a predetermined inspection part of the inspection target when an inspection worker operates a predetermined operation part of the inspection target, wherein the inspection information collecting unit collects, as the inspection information, operation information when an inspection worker operates the operation part of the inspection target, and response information of the inspection target in response to the operation of the operation part, and wherein the inspection information collecting unit collects, as the operation information, sensor information detected by a wearable sensor worn by the inspection worker operating the operation part.

2. The product inspection system according to claim 1, wherein the inspection information collecting unit collects, as the inspection information, control information of an automatic inspection operation device, which is able to automatically operate the inspection target, when the automatic inspection operation device operates a predetermined operation part of the inspection target, and response information of the inspection target in response to the operation of the operation part.

3. The product inspection system according to claim 1, further comprising:

an inspection determination unit which determines an inspection result of the inspection target based on the inspection information recorded in the recording unit.

4. A product inspection method for performing an inspection of an inspection target, the inspection target being a vehicle identified by an inspection target ID, the method comprising the steps of:

collecting inspection information acquired from the inspection target including:

collecting video information acquired by a video device recording a video of a predetermined inspection part of the inspection target when an inspection worker operates a predetermined operation part of the inspection target;

collecting operation information when an inspection worker operates the operation part of the inspection target, and response information of the inspection target in response to the operation of the operation part; and collecting sensor information detected by a wearable sensor worn by the inspection worker operating the operation part;

acquiring an inspection time that the inspection information was acquired;

recording the inspection information and the inspection time with mutually associated in a recording device; and displaying the inspection information recorded in the recording device on a display terminal.

5. The product inspection method according to claim 4, wherein in the step of collecting the inspection information, control information of an automatic inspection operation device, which is able to automatically operate the inspection target, when the automatic inspection operation device operates a predetermined operation part of the inspection target, and response information of the inspection target in response to the operation of the operation part, are collected as the inspection information.

6. The product inspection method according to claim 4, further comprising the step of:

determining an inspection result of the inspection target based on the inspection information recorded in the recording device.

* * * * *